US00RE34260E

United States Patent [19]

Markyvech et al.

[11] E Patent Number: Re. 34,260

[45] Reissued Date of Patent: May 25, 1993

[54] DUAL PRESSURE PRESSURIZED FLUID ACTUATED SHIFTING MECHANISM

[75] Inventors: Ronald K. Markyvech, Allen Park; Thomas A. Genise, Dearborn, both of Mich.

[73] Assignee: Eaton Corporation, Cleveland, Ohio

[21] Appl. No.: 685,804

[22] Filed: Apr. 15, 1991

Related U.S. Patent Documents

Reissue of:

[64] Patent No.: 4,928,544
Issued: May 29, 1990
Appl. No.: 368,010
Filed: Jun. 19, 1989

[51] Int. Cl.[5] ..... F16H 5/06

[52] U.S. Cl. ..... 74/335; 92/62; 74/473 R

[58] Field of Search ..... 74/335, 336 R, 473 R, 74/364, 365, 336, 336.5; 92/13.3, 13.4, 13.6, 62, 76; 91/167 R, 170 R, 186, 530, 535; 318/599

[56] References Cited

U.S. PATENT DOCUMENTS

| | | | |
|---|---|---|---|
| 2,137,953 | 11/1938 | Rowley | 74/335 X |
| 2,568,228 | 9/1951 | Forse | 92/62 X |
| 2,931,237 | 4/1960 | Backus | 74/335 |
| 3,132,531 | 5/1964 | Boughner | 74/335 |
| 3,158,070 | 11/1964 | Olson | 92/62 X |
| 3,793,898 | 2/1974 | Espenschied et al. | 74/335 |
| 4,567,969 | 2/1986 | Makita | 74/335 X |
| 4,570,502 | 2/1986 | Klatt | 74/335 |
| 4,648,290 | 3/1987 | Dunkley et al. | 74/866 |
| 4,841,793 | 6/1989 | Leigh-Monstevens et al. | 74/335 |
| 4,856,360 | 8/1989 | Yoshimura et al. | 74/335 |
| 4,873,881 | 10/1989 | Edelen et al. | 74/336 R |

FOREIGN PATENT DOCUMENTS

| | | | |
|---|---|---|---|
| 58-134256 | 8/1983 | Japan | 74/335 |
| 61-275030 | 12/1986 | Japan | 74/335 |

*Primary Examiner*—Leslie A. Braun
*Assistant Examiner*—Benjamin Levi
*Attorney, Agent, or Firm*—H. D. Gordon

[57] ABSTRACT

A control (220) for providing a dual pressure source (236) of pressurized fluid to a pressurized fluid operated shift actuator (30) for a mechanical change gear transmission (202) is provided.

18 Claims, 4 Drawing Sheets

DUAL PRESSURE PRESSURIZED FLUID ACTUATED SHIFTING MECHANISM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a pressurized fluid operated shifting mechanism, which may be (i) of the "X-Y type" for cooperation with a shift bar housing assembly for selectively shifting a change gear mechanical transmission or (ii) of the type utilizing separate cylinder/piston assemblies for each shift fork. In particular, the present invention relates to an automatically or semi-automatically controlled, pressurized fluid actuated shifting mechanism which is effective to utilize dual pressures to improve shift quality and to minimize wear on the shift mechanism components.

2. Description of the Prior Art

Shift bar housing assemblies for mechanical change gear transmissions comprising a plurality of generally parallel, independently axially movable shift bars or shift rails, each carrying a shift fork fixed thereto, and shift block mechanisms allowing a single shift bar to be selected and axially moved to effect engagement/disengagement of a particular gear ratio are well known in the prior art as may be seen by reference to U.S. Pat. Nos. 2,951,392; 4,455,883; 4,575,029; 4,567,785 and 4,584,895, the disclosures of all of which are hereby incorporated by reference.

Typically, such shift bar housings are manually controlled and operated by a shift finger fixed to a directly mounted shift lever or to the cross shaft of a remotely controlled shifting mechanism. Interlock mechanisms are usually provided to prevent movement of more than one shift rail at a time from the axially centered or neutral positions thereof.

Automatically controlled pressurized fluid actuated X-Y type shifting mechanisms wherein a shift finger is automatically moved in the X or rail selection direction and then in the Y or gear engagement/disengagement direction are known in the prior art as may be seen by reference to U.S. Pat. No. 2,931,237, the disclosure of which is hereby incorporated by reference.

Shift bar housing assemblies utilizing pressurized fluid actuated pistons and the like to control each shift rail in an automatic or semi-automatic mechanical transmission are known in the prior art as may be seen by reference to U.S. Pat. Nos. 4,445,393 and 4,722,237, the disclosures of which are hereby incorporated by reference.

The prior art pressurized fluid actuated shifting mechanisms for providing automatic and/or semi-automatic shifting of mechanical change gear transmissions normally utilized with direct and/or remote manual shifting mechanisms were not totally satisfactory as pressurized fluid was supplied either selectively or constantly to selected chambers at only a single relatively high pressure which resulted in certain operations occurring on a more rapid, harsher basis than desired, overshooting of a selected position and/or the possibility of undue wear to components such as shift forks or the like.

SUMMARY OF THE INVENTION

In accordance with the present invention, the drawbacks of the prior art have been minimized or overcome by the provision of a relatively simple and reliable X-Y shifting mechanism which is easily connectable to electric and pressurized fluid sources which will provide pressurized fluid at a first, relatively high pressurization or at a second, relatively low, pressurization to selected actuator chambers in accordance with predetermined logic rules to minimize wear and to improve performance.

The shift mechanism is preferably electrically controlled and pressurized fluid, preferably pressurized air from a vehicular onboard air system, actuated and preferably requires only a single electric and a single pressurized fluid connection thereto.

Accordingly, it is an object of the present invention to provide a new and improved electrically controlled, pressurized fluid actuated, shift mechanism for a mechanical transmission.

This and other objects and advantages of the present invention will become apparent from a reading of the description of the preferred embodiment taken in view of the attached drawings.

DESCRIPTION OF THE PREFERRED EMBODIMENT

Figure 1:
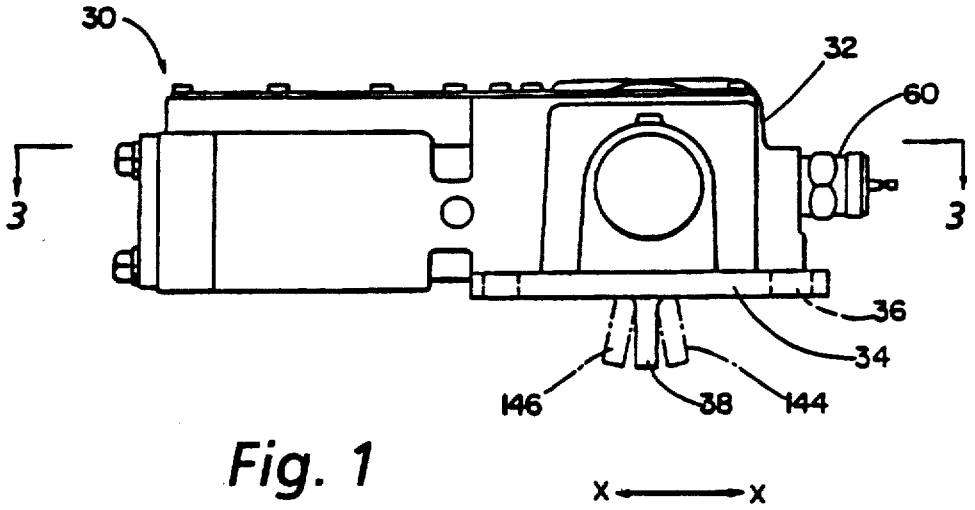
FIG. 1 is a front view of an X-Y shifting utilizing the dual pressure control mechanism of the present invention.
Figure 2:
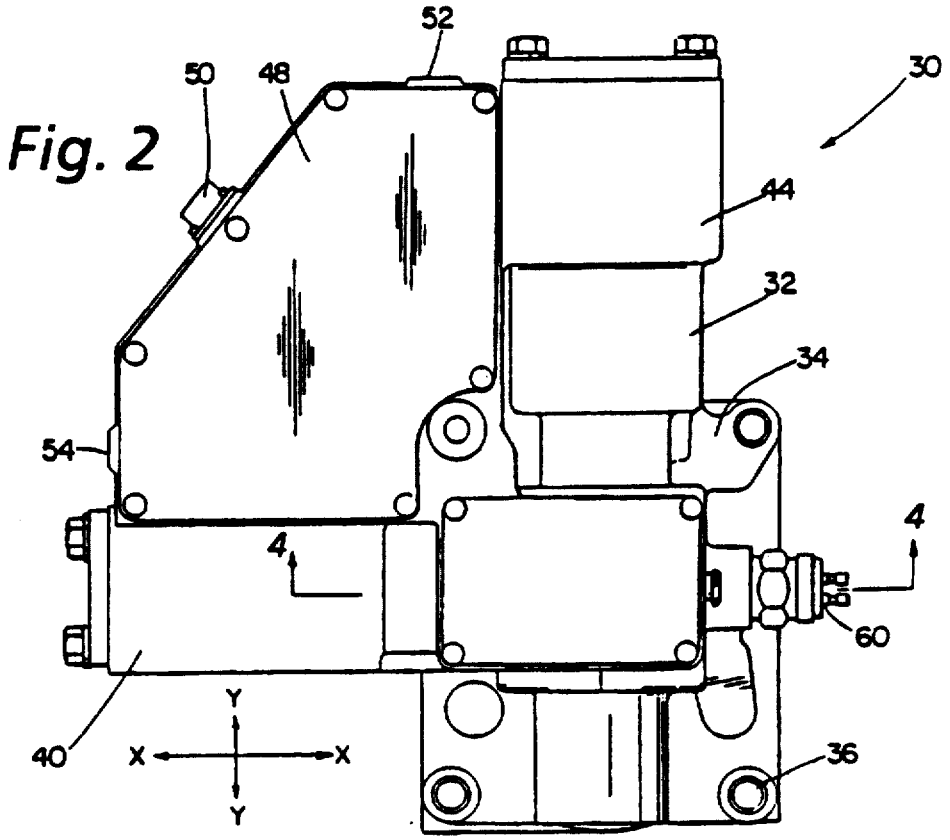
FIG. 2 is a top view of an X-Y shifting mechanism of the present invention.

In this disclosure, certain terminology will be used for convenience in reference only and will not be limiting. For example, the terms "forward" and "rearward" will refer to directions forward and rearward of the vehicle in which the transmission is installed. The terms "rightward", "leftward", "upward" and "downward" will refer to directions as taken in the drawings in connection with which the terminology is used. The terms "inward" and "outward" will refer to directions forward and away from, respectively, the geometric center of the apparatus. The terms "pivot" and "rotate" as used herein will both refer to movement of a specified object about an axis. The foregoing applies to normal derivatives of the above mentioned terms and terms of similar import.

Figure 4:
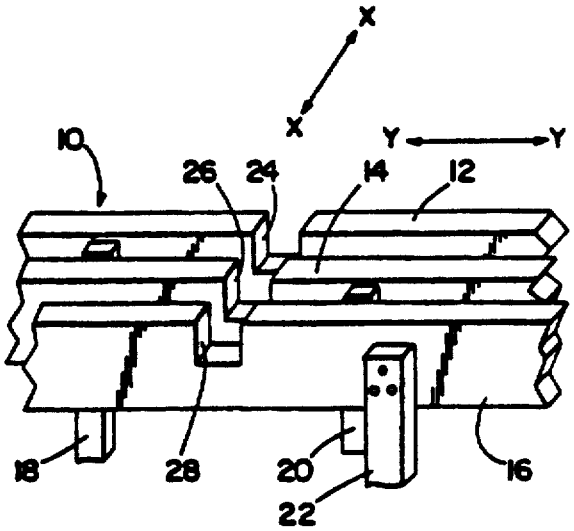
FIG. 4 is a schematic illustration of a portion of mechanical transmission shift bar housing assembly of the type suited for control with the X-Y shifting mechanism of the present invention.

Change gear heavy duty truck mechanical transmissions are well known in the prior art as may be seen by reference to U.S. Pat. No. 3,105,395 hereby incorporated by reference. First class lever mechanisms for directly shifting such change gear transmissions are well known in the art as may be seen by reference to U.S. Pat. Nos. 3,934,485 and 4,022,077, hereby both incorporated by reference. Remote controls for shifting transmissions of this type are also well known in the art as may be seen by reference to U.S. Pat. Nos. 2,040,549; 4,104,929 or 4,157,740 and 4,206,826, all hereby incorporated by reference. Such transmissions typically included a shift bar housing assembly an example of which may be seen schematically in FIG. 4. The shift bar housing assembly 10 typically comprises a plurality of axially movable shift rails, 12, 14 and 16, each of which carry a shift fork 18, 20 and 22, respectively, fixed thereto for axial movement therewith. As is well known, the sift forks are each associated with a Positive clutch mechanism for selectively engaging/disengaging a first and/or a second gear to a shaft.

Typically, shifting of such transmissions is accomplished by selecting a shift rail by moving an engagement member such as a shift finger axially or pivotably along the axis X—X into alignment with a shift block or notch 24, 26 or 28 carried by the selected shift rail and then causing axial movement of the selected shift rail by axially moving or pivoting the shift finger to apply an axial force in the direction of axis Y—Y. In a typical manual transmission, the above is accomplished by utilization of a first class lever which could be pivoted in the directions of axes X—X and Y—Y or by utilization of a shift shaft carrying a shift finger thereon which was axially movable in the direction of axis X—X and then pivotably movable about the axis X—X to apply an axial force in the direction of the axis Y—Y.

The dual pressure shifting mechanism of the present invention is illustrated in connection with an X-Y type mechanism but is also equally applicable to other pressurized fluid actuated mechanisms such as, for example, illustrated in above-mentioned U.S. Pat. Nos. 4,722,237 and 4,445,393.

Automatic and semi-automatic mechanical transmissions based upon generally standard mechanical transmissions provided with electric/pneumatic actuators controlled by a control unit are well known in the prior art as may be seen by reference to U.S. Pat. Nos. 4,648,290 and 4,361,060, the disclosures of which are hereby incorporated by reference.

X-Y shifting mechanism 30 is enclosed within a housing 32 having a mounting plate portion 34 with bolt bores 36 in a pattern allowing the mechanism 30 to be mounted at the upper opening in a transmission shift bar housing normally receiving the shift tower. A shift finger 38 extends downwardly from housing 32 for interaction with the shift rails.

Figure 3:
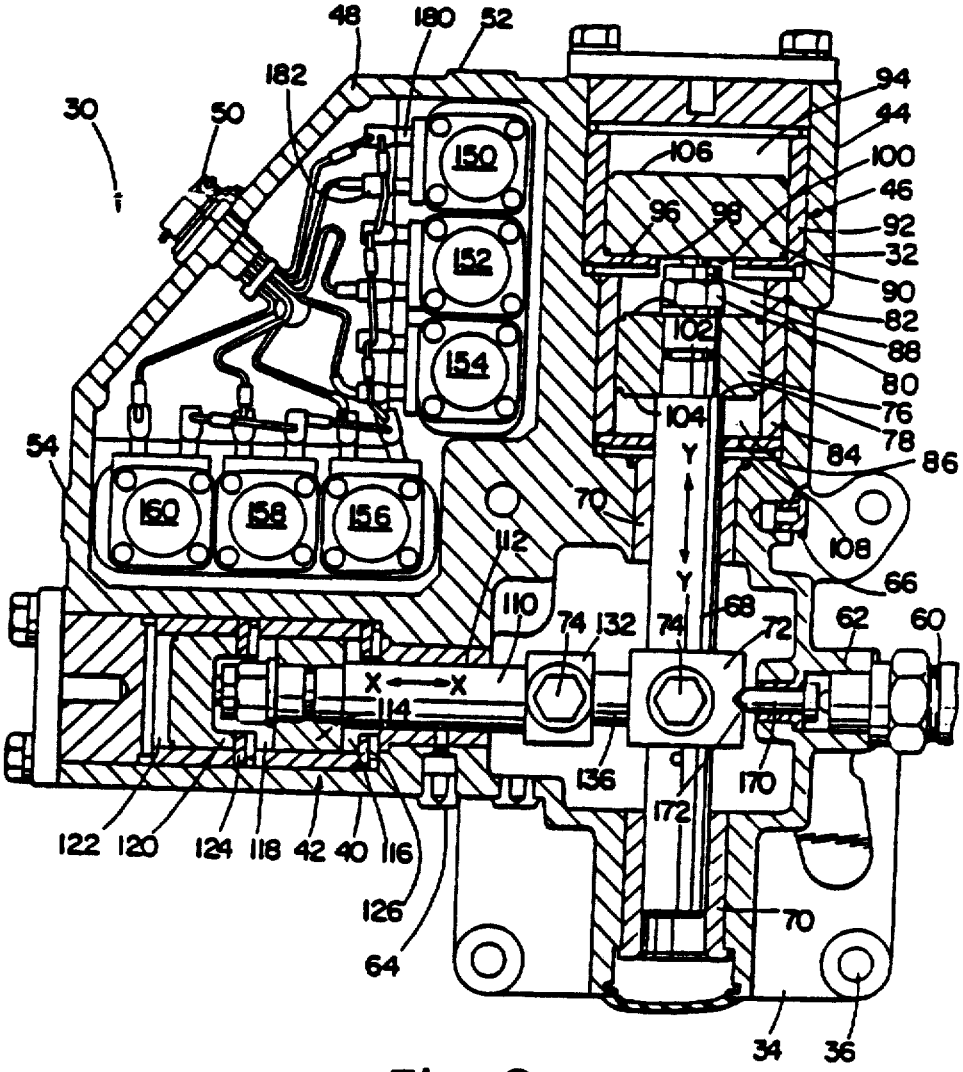
FIG. 3 is a sectional view of the X-Y shifting mechanism utilizing the dual pressure control mechanism of the present invention taken substantially along line 3—3 in FIG. 1.

Housing 32 includes a portion 40 enclosing the select piston/cylinder assembly 42 for moving shift finger, axially or pivotably, in the direction of line X—X for selection of a selected shift rail, 12, 14 or 16; and a transversely extending portion 44 enclosing piston/cylinder assembly 46 for moving shift finger 38 in the direction on line Y—Y to cause axial movement of the selected shift rail and its associated shift fork for engaging or disengaging a selected transmission ratio gear. As is illustrated in FIG. 3, piston/cylinder assembly 46 is larger than piston/cylinder assembly 42 as moving shift finger 38 in the engagement, i.e. Y—Y, direction requires greater force than moving shift finger 38 in the selection, i.e. X—X, direction. Housing 32 also includes a valving portion 48 defining a single multiple pin electric connector 50, a single inlet 52 for connection to a source of pressurized fluid, pressurized to a selected one of two selectable levels of pressurization, such as a regulated, dried, filtered connection to the onboard vehicle air system, and a pressurized fluid exhaust to atmosphere 54. The valving portion 48 also contains the valves for controlling the X—X and Y—Y piston/cylinder assemblies, 42 and 46, respectively, a common pressurized fluid gallery fluidly connected to inlet 52 and a common exhaust gallery fluidly connected to the exhaust outlet 54. Housing 32 also defines a connector 60 for a neutral position sensor 62 and a pair of breather plugs 64 and 66 for the piston/cylinder assemblies. Other vent or breather plugs may be provided as necessary.

The structural details and the operation of X-Y shifter 30 is best appreciated by reference to the sectional drawing in FIG. 3. The engagement/disengagement assembly 46 for moving shift finger 38 in the Y—Y axial direction comprises a shift 68 supported as at sleeve bushings 70 for axial movement in the Y—Y direction, and pivotal movement, relative to housing 32. The shift finger 38 is integral with a shift finger carrier 72 axially and rotationally fixed to shaft 68 as by set screw 74.

Adjacent its upper end, a piston 76 is axially fixed to shaft 68 between a shoulder 78 and a nut and washer 80 retained on threaded upper extension 82 of shaft 68. Piston 76 is slidably and sealingly received within cylinder member 84 to define sealed chambers 86 and 88. A piston 90 is slidably and sealingly received within a cylinder member 92. The piston 90 and cylinder 92 define a sealed chamber 94 above the piston. Downward axial movement of piston 90 is limited by washer shaped stop member 96 having a central opening 98 allowing the lower surface 100 of piston 90 to fluidly communicate with and define chamber 88 and to contact extensions 82 of shaft 68. Surface 100 of piston 90 will contact shaft 68 extension 82 when piston 90 is in its lowest most position and shift finger carrier 72 and shift finger 38 are in the neutral or axially nondisplaced condition as illustrated in FIG. 3. Piston 76 defines an upper and a lower surface 102 and 104, exposed to a pressure in chambers 88 and 86, respectively, which are smaller than the upper surface 106 and lower surface 100 of piston 90 exposed to fluid pressure in chambers 94 and 88, respectively. While surface 106 is equal in area to surface 100, at times when piston surface 100 is engaging stop member 96 or extension 82, the effective area of surface 106 exceeds that of surface 100.

The piston/cylinder assembly 46 allows shaft 68 to assume any selected one of three selectable axial positions, namely axially centered as illustrated in FIG. 3, an upward axial displacement wherein surface 102 will contact stop member 96 and a downward axial displacement wherein surface 104 contacts a stop member 108. The upward and downward displacements are selected in view of the required axial displacements of shift rails and associated shift forks to cause engagement and disengagement of transmission ratio gears.

To cause shaft 68 to assume its axially nondisplaced neutral position, chamber 94 and 86 are pressurized while chamber 88 is exhausted. To cause sift 68 to be displaced axially downwardly, chambers 88 and 94 are pressurized while chamber 86 is exhausted. It is noted that chamber 94 could be exhausted to achieve the same but somewhat slower downward displacement. To cause upward axial displacement of shaft 68, chamber 86 is pressurized while chambers 88 and 94 are exhausted.

Movement of shift finger 38 in the X—X direction to align the shift finger with a selected shift rail is accomplished by selective axial positioning of shaft 110 which is slidably supported in housing 32 as by bushing 112 for movement substantially perpendicular to the axial movement of shaft 68. Except for being somewhat smaller in size, shaft 110 and its associated piston/cylinder assembly 42 is substantially functionally and structurally identical to that of shaft 68 and associated piston/cylinder assembly 46 described above.

Briefly, piston 114 is fixed to shaft 110 and defines sealed chambers 116 on 118 on the right and left faces, respectively, thereof. A larger for contact with a leftwardly extending extension of shaft 110 has a rightwardly facing surface exposed to pressure in chamber 118 and a leftwardly facing surface defining and exposed to fluid pressure in a sealed chamber 122.

A first washer shaped stop member 124 limits rightward axial movement of piston 120 and leftward axial movement of piston 114. Stop member 126 limits rightward axial movement of piston 114.

A crank mechanism for pivoting shift finger 38 in the X—X direction is controlled by shaft 110. A crank connector 132 is attached to shaft 110 as by a set screw or the like. The crank connector 132 includes a portion 136 axially offset but substantially parallel to shaft 110. Portion 136 defines a slot for receipt of a generally bulbulous portion defined by the shift finger carrier to define a ball and slotted socket type connection. The carrier 72 and shift finger 38 are thus a crank lever, pivotably movable about the axis of shaft 68.

In the axially centered position of shaft 110 shown is FIG. 3 shift finger 38 will align with the shift block 26 of shift rail 14. Movement of shaft 110 rightwardly will cause shift finger 38 to pivot to the position illustrated by phantom line 144 for alignment with shift block 28 of shift rail 16. Movement of shaft 110 leftwardly will cause the shift finger 38 to pivot to the position illustrated by phantom line 146 to align with shift block 24 of shift rail 12.

Pressurization of chambers 122 and 116 exhaust of chamber 118 will cause shaft 110 to assume the axially centered position of FIG. 3. Pressurization of chamber 118, and Preferably chamber 122, and exhaust of chamber 116 will cause shaft 110 to be axially displaced rightwardly. Pressurization of chamber 116 and exhaust of chambers 118 and 122 will cause shaft 110 to be displaced axially leftwardly.

Pressurization and exhaust of each of the individual chambers 94, 88, 86, 116, 118 and 122, respectively, is controlled by one of the three-way two-position solenoid valves 150, 152, 154, 156, 158 and 160, respectively. The valves are of a standard type having a first port connected to a common gallery of pressurized fluid supplied by single-inlet connection 52, a second port connected to common exhaust gallery and a third port connected to the individual chamber controlled by the valve. The valves are normally in the chamber exhaust position and, by action of the solenoids are movable to the chamber pressurization position. Control of the various operating solenoids for the valves 150, 152, 154, 156, 158 and 160 is by the single electrical connector 50 which receives commands from a control unit or ECU.

A spring biased detent plunger 170 cooperates with a detent groove 172 to resiliently bias the finger 38 in the neutral condition and cooperates with sensor 62 to provide a neutral signal to the transmission control unit.

It is noted that shaft 68, and thus shift finger 38, once positioned in a selective axial position will remain in that position even if all pressure to the various chambers is removed. However, to assure that the selected gears remain engaged, it is common practice to retain pressure in the appropriate cylinder. This is especially true in those types of three position actuators using only two solenoid valves with a constantly pressurized cylinder chamber and a differential area piston.

Figure 5:
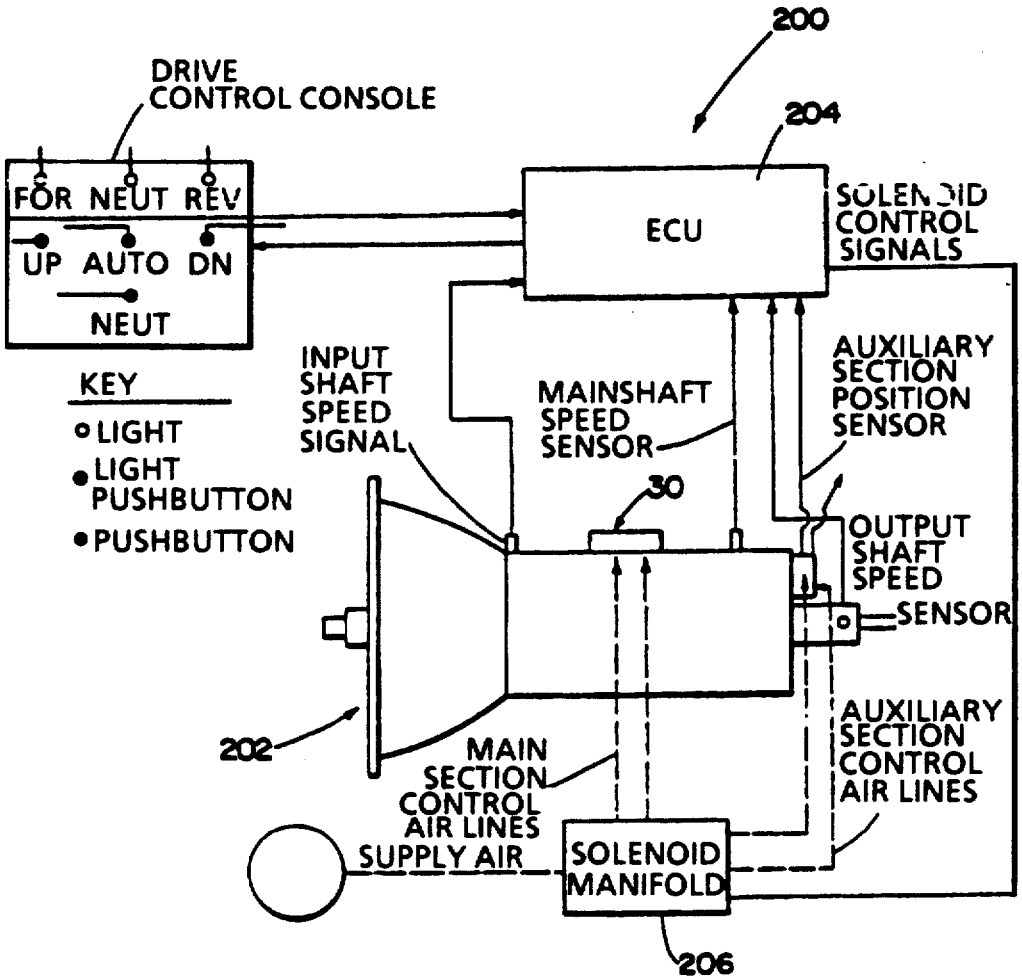
FIG. 5 is a schematic illustration of a partially automated mechanical transmission system in which the invention of the present invention may be advantageously utilized.

FIG. 5 schematically illustrates a typical semi-automatic transmission system 200 utilizing an X-Y shifter assembly. The system includes a mechanical transmission 202 shifted by X-Y shifter 30. An ECU 204 receives various input signals and processes same in accordance with predetermined logic rules to issue command signals to a solenoid manifold 206 which will include the solenoid valves illustrated in FIG. 3 as well as one or more valves to control the pressurization level of the pressurized fluid.

It has been found that shift performance can be increased, by reducing shift harshness, and wear of the shift elements reduced and overshooting of selected positions, especially neutral, reduced if the various shift actuator chambers are subjects to a reduced level or pressurization at selected times. By way of example, after initiation of shift into gear at a relatively high pressure to obtain rapid and good initial jaw clutch penetration, continued high pressure on the actuator may result in undue wear to the shift forks, the actuator and the like when only a reduced pressure in necessary to hold the clutch engaged and/or bias the jaw clutches from only partial to full engagement thereof. Further, a relatively low pressure is sufficient to bias an engaged jaw clutch to neutral upon achieving a transmission torque break or reversal, while subjecting the actuator to relatively high pressure while the jaw clutch is subject to a torque lock may result in undue wear, premature disengagement and/or overshooting of the neutral position.

Briefly, it has been found that pressurizing the pressurized actuator chambers of pressurized fluid actuated shifting devices with an initial high pressurization, i.e. about 60-80 PSI, engage a selected gear ratio, preferably followed by a reduced pressurization, i.e. about 20 PSI, after a preselected period of time, i.e. about 0.5 to 1.0 seconds, to complete the jaw clutch engagement and/or to provide a hold in gear function; and pressurizing the pressurized actuator chambers with the reduced pressurization fluid to disengage a gear ratio provides both improved shift quality and performance and reduced wear.

Figure 6:
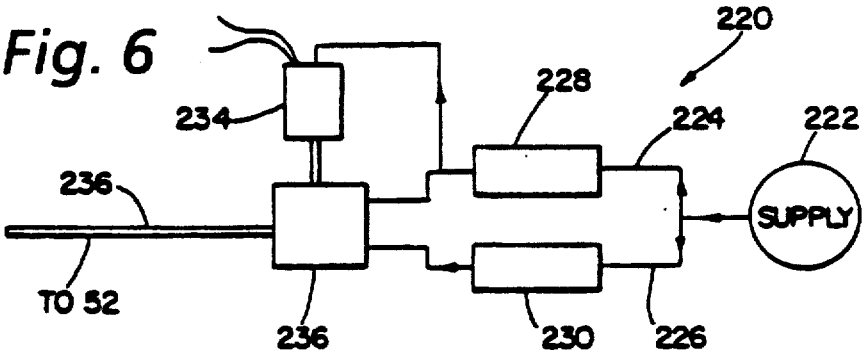
FIG. 6 is a schematic illustration of a system for supplying pressurized fluid at a selected one of two levels of pressurization.
Figure 7:
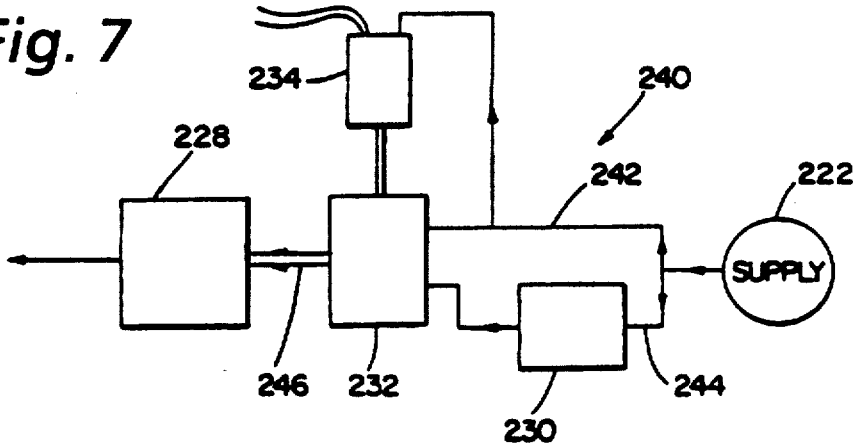
FIG. 7 is a schematic illustration of an alternate system for supplying pressurized fluid at a selected one of two levels of pressurization.

Two alternate systems for selectively providing a selected relatively high or relatively low pressurization level pressurized fluid to the solenoid valves are illustrated in FIGS. 6 and 7.

In system 220, pressurized fluid from supply 222 is split into parallel paths 224 and 226, respectively, controlled by an 80 psi and 20 psi regulator, 228 and 230, respectively. A three-way, two-position valve 232, controlled by solenoid 234 will connect either the 80 psi or 20 psi pressurized fluid to outlet conduit 236 which leads to the control solenoid valves. Solenoid 234 is controlled by an ECU, such as ECU 204 described above.

In system 240, pressurized fluid from supply 222 is split into two paths 242 and 244. Path 242 connects directly to three-way, two-position valve 232 controlled by solenoid 234, while path 244 includes a 20 psi regulator. The valve 232 will connect either full supply pressure, or 20 psi pressurized fluid to the outlet conduit 246 which includes an 80 psi regulator 228.

Various other control circuits are, of course, also possible. For example, dual or multiple pressure may be obtained by pulse width modulation of a solenoid operated pressure regulator. The regulators and three-position valves may be of any will known construction.

Accordingly, it may be seen that a relatively simple dual pressure system for pressurized fluid shift actuators for mechanical change gear transmissions has been provided.

Although the present invention has been described with a certain degree of particularity, it is understood that the description is by way of example only and is not intended to be limiting. Various substitution and rearrangements of the components are possible without departing from the spirit and the scope of the invention as hereinafter claimed.

We claim:

[1. A control system for controlling pressurized fluid operated shift actuators (30) for mechanical transmissions, said actuators including a first (88) and a second (86) pressurizable chamber, pressurization of said first chamber effective to urge said actuator into a first position for causing engagement of a selected ratio of said transmission and pressurization of said second chamber effective to urge said actuator into a second position for causing disengagement of said selected ratio, and shift control means for selectively pressurizing and venting selected ones of said first and second chambers by selectively connecting same to a controlled source (236) of pressurized fluid and to an exhaust (54), said system characterized by:

means (220) for causing said controlled source to be pressurized to a selected one of a first pressure level or a second relatively lesser pressure level.]

2. The control system of claim [1] *15* wherein said first pressure level is at least twice as great as said second pressure level.

3. The control system of claim [1] *15* wherein said first pressure level is at least four times as great as said second pressure level.

[4. The control system of claims 1, 2, or 3 wherein said first chamber is pressurized to said first pressure level to cause engagement of said selected ratio and said second chamber is pressurized to said second pressure level to cause disengagement of said selected ratio.]

5. The control system of claim [1, 2 or 3] *15* wherein said first chamber is maintained pressurized to retain said first ratio engaged, said first chamber pressurized to said first pressure level at initiation of engagement of said selected ratio and, after a predetermined time, maintained pressurized at said second pressure level, said second chamber pressurized to said second pressure level.

[6. The control system of claim 1, 2 or 3 wherein said pressurized fluid is a gas.]

7. The control system of claim [4] *15* wherein said pressurized fluid is a gas.

8. The control system of claim 5 wherein said pressurized fluid is a gas.

[9. A control method for controlling pressurized fluid operated shift actuators (30) for mechanical transmissions, said actuators including a first (88) and a second (86) pressurizable chamber, pressurization of said first chamber effective to urge said actuator into a first position for causing engagement of a selected ratio of said transmission and pressurization of said second chamber effective to urge said actuator into a second position for causing disengagement of said selected ratio, shift control means for selectively pressurizing and venting selected ones of said first and second chambers by selectively connecting same to a controlled source (236) of pressurized fluid and to an exhaust (54), said method characterized by:

causing said controlled source to be pressurized to a selected one of a first pressure level or a second relatively lesser pressure level.]

10. The control method of claim [9] *16* wherein said first pressure level is at least twice as great as said second pressure level.

11. The control system of claim [9] *16* wherein said first pressure level is at least four times as great as said second pressure level.

12. The control system of claims [9, 10 or 11] *16* wherein said first chamber is maintained pressurized to retain said first ratio engaged, said controlled source is pressurized to said first pressure level at initiation of engagement of said selected ratio and, after a predetermined time, said controlled source is maintained at said second pressure level, said controlled source is pressurized to said second pressure level when said selected ratio is to be disengaged.

13. The control method of claims [9] *16* 10 [and] *or* 11 wherein said pressurized fluid is a gas.

14. The control method of claim 12 wherein said pressurized fluid is a gas.

*15. A control system for controlling pressurized fluid operated shift actuators (30) for mechanical transmissions, said actuators including a piston (76) having a first (102) and an opposed second (104) piston face associated with a first (88) and a second (86) pressurizable chamber, respectively, said piston faces of substantially equal area, pressurization of said first chamber effective to urge said actuator into a first position for causing engagement of a selected ratio of said transmission and pressurization of said second chamber effective to urge said actuator into a second position for causing disengagement of said selected ratio, and shift control means for selectively pressurizing and venting selected ones of said first and second chambers by selectively connecting same to a controlled source (236) of pressurized fluid and to an exhaust (54), said system characterized by:*

*means (220) for causing said controlled source to be pressurized to a selected one of a first pressure level or a second relatively lesser pressure level, said first chamber pressurized to said first pressure level to cause engagement of said selected ratio and said second chamber pressurized to said second pressure level to cause disengagement of said selected ratio.*

*16. A control method for controlling pressurized fluid operated shift actuators (30) for mechanical transmissions, said actuators including a piston (76) having a first (102) and an opposed second (104) piston face associated with a first (88) and a second (86) pressurizable chambers respectively, said piston faces of substantially equal area, pressurization of said first chamber effective to urge said actuator into a first position for causing engagement of a selected ratio of said transmission and pressurization of said second chamber effective to urge said actuator into a second position for causing disengagement of said selected ratio, shift*

*control means for selectively pressurizing and venting selected ones of said first and second chambers by selectively connecting same to a controlled source (236) of pressurized fluid and to an exhausts (54), said method characterized by:*

*causing said controlled source to be pressurized to a selected one of a first pressure level or a second relatively lesser pressure level, said first chamber pressurized to said first pressure level to cause engagement of said selected ratio and said second chamber pressurized to said second pressure level to cause disengagement of said selected ratio.*

*17. A control system for controlling shift actuators (30) for mechanical transmissions, said actuators including a mechanism effective to selectively urge said actuators into a first position for causing engagement of a selected ratio of said transmission and to urge said actuator into a second position for causing disengagement of said selected ratio, and shift control means characterized by:*

*means for causing said mechanism to exert a selected one of at least a first force level or a second lesser force level, said means causing said mechanism to exert said first force level to cause engagement of said selects ratio and said means causing said mechanism to exert said second force level to cause disengagement of said selected ratio.*

*18. The control system of claim 17 wherein said first force level is at least twice as great as said second force level.*

*19. The control system of claim 17 wherein said actuator is maintained under force to retain said first ratio engaged, said actuator exerting said first force level at initiation of engagement of said selected ratio and, after a predetermined time, maintained at exerting said second force said actuator exerting only said force level for causing disengagement of said selected ratio.*

*20. A control method for controlling shift actuators (30) for mechanical transmissions, said actuators including a mechanism effective to selectively urge said actuator into a first position for causing engagement of a selected ratio of said transmission and to urge said actuator into a second position for causing disengagement of said selected ratio, said method characterized by:*

*causing said mechanism to exert a selected one of at least a first force level or a second relatively lesser force level, including causing said mechanism to exert said first force level at initiation of engagement of said selected ratio and to exert said second force level when said selected ratio is to be disengaged.*

*21. The control method of claim 20 wherein said first force level is at least twice as great as said second force level.*

*22. The control method of claim 20 wherein said actuator is maintained under force to retain said first ratio engaged, said actuator exerting said first force level at initiation of engagement of said selected ratio and, after a predetermined time, maintained at exerting said second force said actuator exerting only said force level for causing disengagement of said selected ratio.*

* * * * *